(12) United States Patent
Skinner et al.

(10) Patent No.: US 6,488,357 B2
(45) Date of Patent: Dec. 3, 2002

(54) CORRISION RESISTANT HYDROPHOBIC LIQUID LEVEL CONTROL PLATE FOR PRINTHEAD OF INK JET PRINTER AND PROCESS

(75) Inventors: David Skinner, Rochester, NY (US); Hiep Ly, Webster, NY (US); Daniel Foucher, Rochester, NY (US); Ming-Hong Fu, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/730,291

(22) Filed: Dec. 5, 2000

(65) Prior Publication Data

US 2002/0097297 A1 Jul. 25, 2002

(51) Int. Cl.$^7$ ................. B41J 2/14; B41J 2/16
(52) U.S. Cl. ........................................ 347/47
(58) Field of Search ............................ 347/45

(56) References Cited

U.S. PATENT DOCUMENTS

| | | | | |
|---|---|---|---|---|
| 4,343,013 A | * | 8/1982 | Bader et al. | 347/47 |
| 4,623,904 A | * | 11/1986 | Conta et al. | 347/68 |
| 4,651,174 A | * | 3/1987 | Bava et al. | 347/47 |
| 6,325,490 B1 | * | 12/2001 | Yang et al. | 347/45 |

* cited by examiner

*Primary Examiner*—John Barlow
*Assistant Examiner*—Michael S. Brooke
(74) *Attorney, Agent, or Firm*—Perman & Green, LLP

(57) ABSTRACT

Process for producing a corrosion-resistant liquid level control plate for the printhead of an aqueous ink jet printing machine. A corrosion-resistant metal alloy base is used, having an undersurface and an upper surface and having closely-spaced ink jet nozzles therethrough. Each of the nozzles has a micro-orifice at the undersurface surrounded by a lip area at the bottom of upwardly and outwardly tapered walls opening at the upper surface. The present process comprises forming the lip areas of metallic gold, encapsulating the upper surface of the metal alloy base including the gold lip areas and the tapered walls with metallic gold to form a corrosion-resistant, hydrophobic surface layer thereover. Thereafter the undersurface is coated with metallic chromium to render it hydrophilic. The gold coating preferably is reacted with a self assembled monolayer (SAM) of an organic sulfur compound such as hexadecylthiol or, more preferably, a cross-linkable SAM which is then cross-linked in situ to form a rub-resistant layer having strong hydrophobic properties. The chrome coating on the undersurface may be coated with a hydrophilic silane to increase its hydrophilic properties.

11 Claims, 2 Drawing Sheets

CORRISION RESISTANT HYDROPHOBIC LIQUID LEVEL CONTROL PLATE FOR PRINTHEAD OF INK JET PRINTER AND PROCESS

BACKGROUND OF THE INVENTION

1. Field of the Invention

The present invention relates to ink jet printing machines and, more particularly, to improvements in the liquid level control (LLC) plate within the ink reservoir of the printhead of such machines, which plate has an undersurface or ink side which engages the aqueous liquid jet ink and controls the level of the ink within the reservoir. The LLC plate also has an upper surface, or paper side, and a jet passage having a rim, or lips, through which the aqueous ink is passed, in controlled spurts, against a copy paper to form images thereon.

2. Prior Art

Conventional LLC plates are formed of a base metal of iron-nickel alloy and the lips are formed of high phosphorous nickel metal in a thickness of 3 microns. A protective layer of low phosphorous nickel is then applied thereover to provide a corrosion barrier to the aqueous jet ink. A top layer of Parylene C, a soft polymer material, is applied over both sides of the LLC plate, including the lips, as a hydrophobic coating. Finally chromium metal is sputtered over the ink side of the LLC plate to render the undersurface or ink side less hydrophobic and more wetable by the aqueous ink to avoid the formation of bubbles. Thus, as required for ink maintainability, the external surface or paper side of the LLC plate is ink-repellant, and the undersurface or ink side is ink-attractive.

A corrosion problem exists with the high phosphorous nickel lip material due to the high incompatibility of such material with aqueous jet inks which, when in direct contact therewith, dissolve the lip material. The protective coating of low phosphorous nickel does not provide adequate protection against such dissolving action but the Parylene C does provide an adequate barrier. However, the Parylene C coating is relatively soft and subject to removal by contact during handling or mechanical abrasion, thereby exposing the phosphorous nickel lip coatings to contact with the aqueous jet ink during operation of the printer, resulting in lip corrosion and reduced print quality.

SUMMARY OF THE INVENTION

The present invention resides in the discovery of an entirely metallic LLC plate for aqueous ink jet printing machines, such as of the acoustic and thermal types, which is non-corrosive by aqueous jet inks and is resistant to damage by contact during handling or mechanical abrasion. The present LLC plates are formed of a corrosion-resistant base metal such as iron-nickel alloy but the lips are formed of gold and the upper surface or paper side, including the gold lips, is overcoated with a hydrophobic gold encapsulation which is corrosion resistant. The undersurface of the LLC plate is coated with sputtered chromium. The upper surface of the gold preferably is reacted with an organic thiol self-assembled monolayer (SAM) or mercaptan compound, most preferably a cross-linked SAM, to further increase its hydrophobic properties.

DETAILED DESCRIPTION OF THE PREFERRED EMBODIMENT

Figure 1:
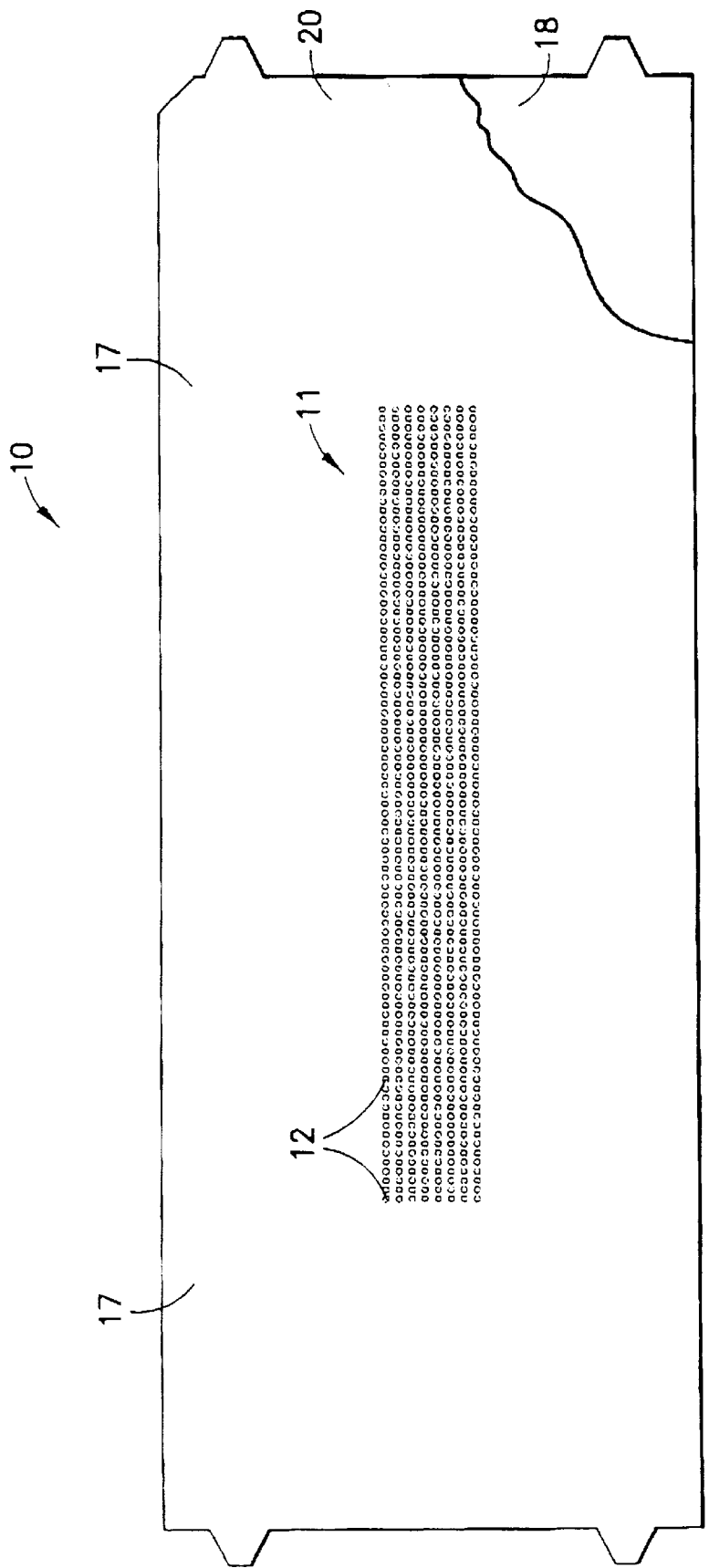
FIG. 1 is a face view of the liquid level control (LLC) plate of an acoustic or thermal ink jet printer according to an embodiment of the present invention, showing an intermediate area consisting of a plurality of ink jet nozzles.
Figure 2:
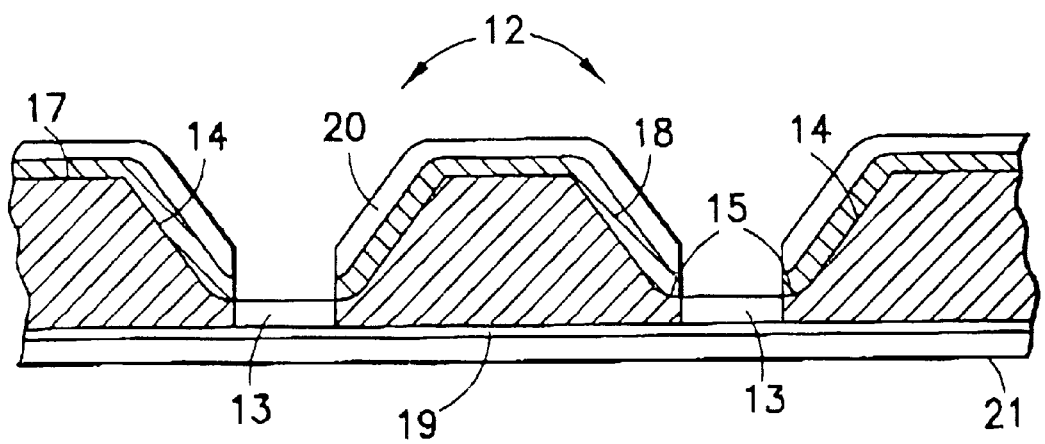
FIG. 2 a vertical cross-section, to an enlarged scale of a section of the intermediate area of the LLC plate of FIG. 1, illustrating a pair of adjacent nozzles.
Figure 3:
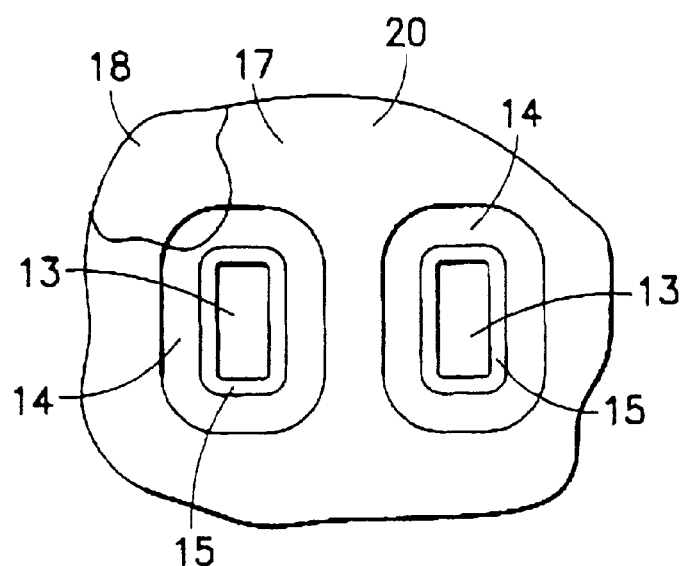
FIG. 3 is a face view of the section of FIG. 2.

Referring to the drawings, the present LLC plates 10 of FIG. 1 are elongate flexible thin metal plates, such of Alloy 42 (iron-nickel) or other strong flexible metal which is resistant to corrosion, having an intermediate or central area 11 formed with a plurality of closely-spaced ink spray nozzles 12, each having a micro-orifice 13, shown in FIGS. 2 and 3, for spraying tiny jets of aqueous ink from an underlying ink reservoir of an acoustic or thermal ink jet printer against an adjacent ink-absorbing copy sheet.

Referring to FIGS. 2 and 3 the intermediate LLC plate area 11 consists of closely-spaced nozzles 12, each comprising a downwardly and inwardly tapered wall section 14 terminating in a thin narrow lip section 15 surrounding a somewhat-rectangular micro-orifice 13 opening into each nozzle 12 from the chrome-coated undersurface 16 of LLC plate 10 out to the hydrophobic upper surface 17 thereof. Typically the orifices are $80\mu \times 180\mu$ in dimension.

Conventionally, the lip section of LLC plates has been formed of $3\mu$ thick nickel metal which is high in phosphorous, encapsulated by a top protective coating of low phosphorous nickel metal which covers the lip areas, wall areas and the entire upper surface of the LLC plate including the intermediate or central area.

This protective nickel coating does not provide adequate corrosion resistance and therefore a top and bottom coating of the non-metallic Parylene C polymer must be applied thereover.

The present invention is based upon the discovery that gold is inert to aqueous jet inks and is not corroded thereby, and also provides a continuous metallic layer which is resistant to removal or cracking by mechanical abrasion during handling. Moreover gold provides a hydrophobic surface which repels and is not wetted by aqueous jet inks, thereby preventing the accumulation of residual jet ink at the spray nozzles and on the entire upper surface of the LLC plate.

The novel liquid level control plates 10 of the present invention overcome the need for phosphorous nickel lips and coatings, which are reactive with and soluble in aqueous jet inks, and the need for soft, non-metallic protective polymer coatings, such as Parylene C, which are susceptible to removal by mechanical contact or abrasion to expose the underlying phosphorous nickel coating and lips to direct contact and reaction with the corrosive aqueous jet ink. Parylene C is a polymer of dichloro-di-p-xylylene.

The present LLC plates 10 have a conventional thin, flexible corrosion-resistant alloy base formed with an intermediate or central area 11 having a plurality of ink spray nozzles 12, the orifices 13 of which are formed by depositing metallic gold to form thin lip areas 15 at the base of the tapered wall sections 14 to surround and form the orifices 13. This is accomplished preferably by electrodeposition.

Thereafter a continuous encapsulation coating 18 of metallic gold is deposited over the lip areas 15 and also over the tapered wall sections 14 and the entire upper surface 17 of the LLC plate 10, including the intermediate or central multi-nozzle area 11 of the LLC plate 10 to provide an upper gold surface 17 which covers the nozzles including lips 15, walls 14 and the surface areas between the nozzles. The gold coating 18 or plate is hydrophobic and the formed LLC plate 10 is completely metallic. The undersurface 16 is coated with chromium metal 19 to render it less hydrophobic than the gold layer 18 and give it an increased affinity for aqueous ink, which it contacts as a level control member within the ink reservoir of the acoustic or thermal ink jet printer.

According to a preferred embodiment, the gold plating or coating 18 on the upper surface 17 is reacted with an organic sulfur compound or mercaptan (SAM) such as hexadecylthiol, or hexadecylthiol 1H, 1H, 2H, 2H-perfluorodecanethiol or most preferably with a cross-linkable organic sulfur compound which is cross-linked in-situ to produce a stable, inert hydrophobic surface layer 20. This treatment does not affect the chrome undersurface layer since chrome is not reactive with organic sulfur compounds and will not bond thereto.

If desired the chrome undersurface layer can be selectively treated with a hydrophilic silane coating 21 to increase the hydrophilic properties of the ink side of the LLC plate.

The anti-corrosion properties of the present LLC plates were determined and compared with those of (A) the uncoated A-42 iron-nickel alloy base metal, with those of (B) the base metal coated with high phosphorous nickel 10–12% phosphorous from a phosphite plating bath with those of (C) the base metal coated with the high phosphorous nickel overcoated with $1\mu$ of low phosphorous nickel 1–3% phosporous from a plating bath over the high phosphorous nickel, and with those of (D) the base metal coated with $1\mu$ gold.

In each case the $3\mu$ thick specimens were soaked in Xerox Ink Harmony 1.0 black aqueous ink. After 20 days of accelerated life soaking at 80° C., the corrosion rates were measured in terms of $\mu$/year with the following results:

| Specimen | Corrosion ($\mu$/year) |
| --- | --- |
| A (Alloy-42 base) | 0.63 ± 0.22 |
| B (High P—Ni) | 35.0 ± 7.70 |
| C (Low P—Ni over High P—Ni) | 68.6 ± 19.4 |
| D (Gold over A-42) | 0.77 ± 0.20 |

The gold encapsulation layer preferably is applied over the entire LLC plate including the nozzles 12, lips 15 and upper surface 17 and undersurface 16, by electro deposition to assure complete coverage of all surfaces, most particularly the lip areas 15 and wall surfaces 14 of the nozzles. On the undersurface 16 the chromium metal layer 19 is sputtered over the electrodeposited gold layer 18, except in the lip areas 15 which are masked or otherwise protected against chromium deposit.

Most preferably the present gold-plated liquid level control plates are overcoated with a self-assembled monolayer 20 (SAM) of a cross-linkable organic thiol compound which is cross-linked in-situ to form a strong, robust, wear-resistant hydrophobic layer over the corrosion-resistant gold plate.

Self-assembled monolayers (SAMs) are molecular assemblies of organic and/or organometallic thiol monolayers that are formed by the immersion of an appropriate substrate into a solution of the thiol compound in an organic solvent. The driving force for the assembly process is the highly exothermic chemisorption of the "head" group of the thiol molecule to the substrate surface. Because of the high exothermicity of the head group-substrate interactions, molecules tend to occupy every available binding site on the substrate surface, which leads to the packing and eventual organization of the adsorbed molecules. Organosulfur-metal systems offer the best presently available combination of high selectivity, high structural order, a wide variety of "tail" groups that can be used, and ease of preparation.

Ink jet print heads are exposed to a wide variety of environments and conditions, many of which are highly corrosive. It is critical to prevent the corrosion of these high precision components in order to maintain optimal jetting performance and extend the lifetime of the printhead. The preferred solution to this corrosion problem is the use of a cross-linked thiol SAM modified gold lip in place of the high phosphorous nickel material. The chemical inertness of gold provides the corrosion resistance needed and the thiol SAM provides the hydrophobicity that is needed. The use of a thiol SAM modified gold lip for corrosion resistance, under most conditions is sufficient. However, a more robust hydrophobic layer is required in the case of a print head which undergoes many cycles of mechanical wiping as part of its jetting performance maintenance. The crosslinking of the thiol SAM molecules provides the mechanical robustness needed while still maintaining the level of hydrophobicity that is required for ink maintainability.

The following two examples illustrate the preparation of a hydrophobic thiol SAM on a gold surface:

EXAMPLE 1

Modification of the gold surface with 1,1'-biphenyl-4-thiol (BPT) followed by electron-induced cross-linking of the neighboring phenyl groups, as shown below. Precedence for this chemistry has been published by A. Golzhauser in Appl. Phys. Lett. (1999), 75(16), 2401–2403.

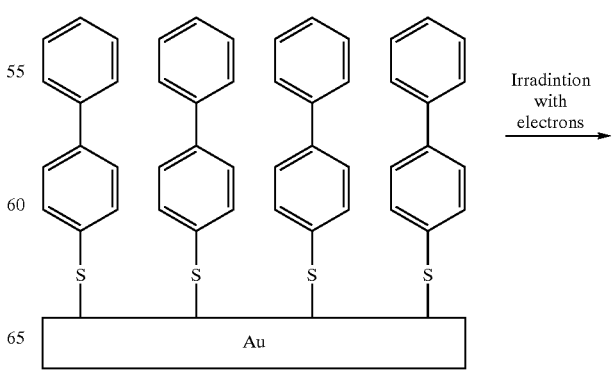

-continued

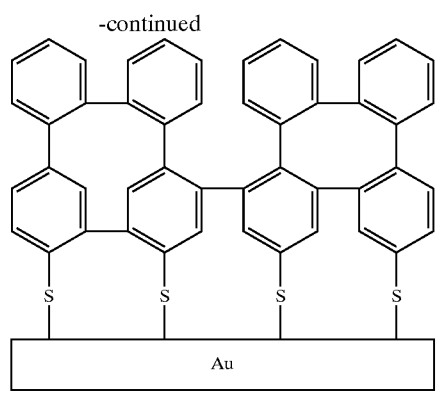

EXAMPLE 2

Modification of the gold surface with an α-alcohol-ω-mercapto-containing compound (i.e. 8-mercapto octanol or 11-mercapto undecanol); followed by vapor phase coupling of an acrylate-containing acid chloride functionality (i.e. acryloyl chloride, cinnamoyl chloride, crotonyl chloride) to the alcohol end of the SAM; followed by photo initiated cross-linking of the vinyl groups, as shown below. Because of the reactivity of thiols towards vinyl groups, it is necessary to first modify the surface with the alcohol-thiol, then convert the alcohol functionality to an acrylate functionality.

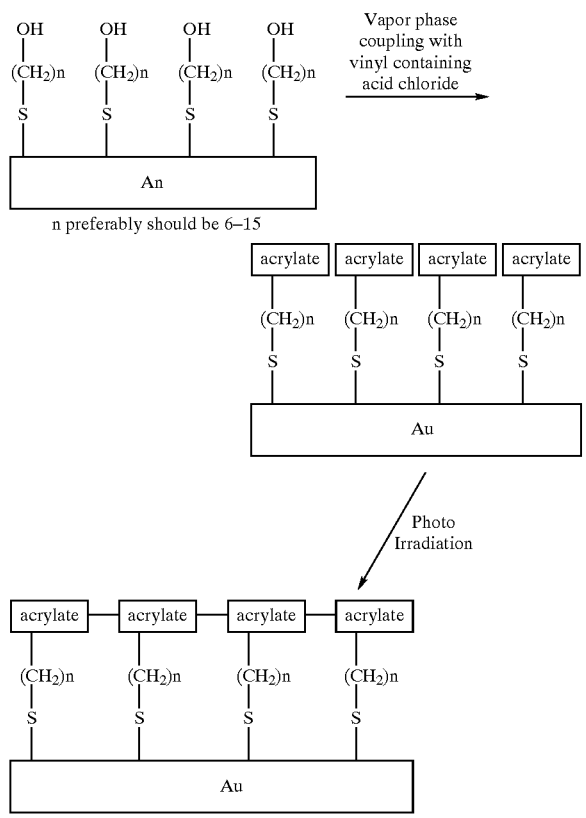

Cross-linking of ethylenically-unsaturated or biphenyl thiols can be easily achieved by photo-, chemical, or electrically-induced means to provide tough, robust monolayers.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A liquid level control plate for the printhead of an aqueous ink jet printing machine, comprising a thin flexible corrosion-resistant metal alloy base having an upper surface and an undersurface and having formed therethrough a plurality of ink jet nozzles each having a micro-orifice at said undersurface surrounded by a lip area at the bottom of upwardly and outwardly tapered walls of the metal alloy base, said lip area being formed of gold metal and the upper surface of said metal alloy base, including said gold lip area and said tapered walls of each nozzle, being encapsulated by a layer of gold metal to form a hydrophobic upper surface which repels aqueous ink from accumulating thereon, and a coating of chromium metal on the undersurface of said metal alloy base, wherein the gold metal on said hydrophobic upper surface is covered with a thin layer of a cross-linked organic sulfur compound having increased stability, rub-resistance and hydrophobicity.

2. A liquid level control plate according to claim 1 in which the gold metal on said hydrophobic upper surface is covered with a thin layer of a long chain aliphatic sulfur compound to increase its hydrophobicity.

3. A liquid level control plate according to claim 2 in which the aliphatic sulfur compound is hexadecylthiol.

4. A liquid level control plate according to claim 2 in which the aliphatic sulfur compound is hexadecylthiol with 1H, 1H, 2H, 2H-perfluorodecanethiol.

5. A liquid level control plate according to claim 1 in which said organic sulfur compound is a 1,1'-biphenyl-4-thiol.

6. A liquid level control plate according to claim 1 in which said organic sulfur compound is an alpha-alkoxy-omega-mercapto aliphatic compound having from 6 to 15 carbon atoms, coupled with an ethylenically-unsaturated compound.

7. A liquid level control plate according to claim 6 in which said organic sulfur compound is 8-mercapto octanol.

8. A liquid level control plate according to claim 6 in which said organic sulfur compound is 1-mercapto undecanol.

9. A liquid level control plate according to claim 1 in which the layer of chromium metal on the undersurface of the base is coated with a hydrophilic silane to increase its hydrophilicity.

10. A liquid level control plate according to claim 9 in which the hydrophilic silane is n-(3-triethoxysilylpropyl) gluconamide.

11. A liquid level control plate according to claim 1 in which the undersurface of the metal alloy base is also encapsulated by the layer of gold metal, and the coating of chromium metal is applied thereover.

* * * * *